United States Patent
Iravantchi et al.

(10) Patent No.: US 12,474,831 B2
(45) Date of Patent: Nov. 18, 2025

(54) LEVERAGING SURFACE ACOUSTIC WAVE FOR DETECTING GESTURES

(71) Applicant: THE REGENTS OF THE UNIVERSITY OF MICHIGAN, Ann Arbor, MI (US)

(72) Inventors: Yasha Iravantchi, Ann Arbor, MI (US); Alanson Sample, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/498,110

(22) Filed: Oct. 31, 2023

(65) Prior Publication Data

US 2024/0143164 A1 May 2, 2024

Related U.S. Application Data

(60) Provisional application No. 63/421,233, filed on Nov. 1, 2022.

(51) Int. Cl.
*G06F 3/04883* (2022.01)
*G06F 3/043* (2006.01)

(52) U.S. Cl.
CPC ........ *G06F 3/04883* (2013.01); *G06F 3/0436* (2013.01)

(58) Field of Classification Search
CPC ............................ G06F 3/04883; G06F 3/0436
See application file for complete search history.

(56) References Cited

U.S. PATENT DOCUMENTS

| 10,999,684 | B1* | 5/2021 | Wan | H04R 17/02 |
|---|---|---|---|---|
| 2001/0006006 | A1* | 7/2001 | Hill | G06F 3/016 |
| | | | | 73/606 |
| 2004/0216526 | A1* | 11/2004 | Cook | G01L 19/0092 |
| | | | | 73/708 |
| 2009/0016550 | A1* | 1/2009 | Qiao | B81C 1/00182 |
| | | | | 381/175 |
| 2010/0019922 | A1* | 1/2010 | Van Loenen | G06F 3/0433 |
| | | | | 341/20 |
| 2010/0278372 | A1* | 11/2010 | Zhang | H04R 1/222 |
| | | | | 381/412 |
| 2011/0191680 | A1* | 8/2011 | Chae | G06F 3/04883 |
| | | | | 715/716 |
| 2012/0212925 | A1* | 8/2012 | Zoellin | G01L 19/0084 |
| | | | | 361/807 |
| 2014/0191963 | A1* | 7/2014 | Murakoshi | G06F 3/0433 |
| | | | | 345/158 |

(Continued)

*Primary Examiner* — Ariel A Balaoing
(74) *Attorney, Agent, or Firm* — Harness, Dickey & Pierce, P.L.C.

(57) ABSTRACT

A system is presented for detecting gestures. The system is comprised of: a contact microphone and a signal processor. The contact microphone is attached to a surface of interest of an objection and is configured to measure surface acoustic waves traveling along the surface of interest. The signal processor is interfaced with the contact microphone and is configured to receive a signal from the contact microphone, where the signal is indicative of surface acoustic waves traveling along the surface of interest. The signal processor operates to identify a gesture made by a person on the surface of interest using the signal.

18 Claims, 11 Drawing Sheets

(56) References Cited

U.S. PATENT DOCUMENTS

| | | | |
|---|---|---|---|
| 2014/0254835 A1* | 9/2014 | Yakura | H04R 19/005 |
| | | | 381/174 |
| 2015/0242036 A1* | 8/2015 | Heidari | G06F 3/0418 |
| | | | 345/173 |
| 2018/0239435 A1* | 8/2018 | Ashoori | G06F 1/1694 |
| 2024/0067520 A1* | 2/2024 | Streb | B81B 3/0005 |

* cited by examiner

| Condition (Accelerometer) | Finger Tap | Finger Swipe | Finger Fling | Nail Tap | Nail Swipe | Nail Fling |
|---|---|---|---|---|---|---|
| Close Distance (Wood) | Y | ~ | N | Y | Y | ~ |
| Medium Distance (Wood) | ~ | N | N | Y | ~ | N |
| Long Distance (Wood) | N | N | N | ~ | N | N |
| Music/Speech/Noise | Y | ~ | N | Y | Y | ~ |
| Metal | Y | N | N | Y | N | N |
| Glass | Y | N | N | Y | N | N |

| Condition (Regular Mic) | Finger Tap | Finger Swipe | Finger Fling | Nail Tap | Nail Swipe | Nail Fling |
|---|---|---|---|---|---|---|
| Close Distance (Wood) | Y | ~ | ~ | Y | ~ | ~ |
| Medium Distance (Wood) | Y | N | N | Y | N | N |
| Long Distance (Wood) | Y | N | N | Y | N | N |
| Music/Speech/Noise | N | N | N | N | N | N |
| Metal | Y | N | N | Y | N | N |
| Glass | Y | N | N | Y | N | N |

| Condition (SAW Mic) | Finger Tap | Finger Swipe | Finger Fling | Nail Tap | Nail Swipe | Nail Fling |
|---|---|---|---|---|---|---|
| Close Distance (Wood) | Y | Y | Y | Y | Y | Y |
| Medium Distance (Wood) | Y | Y | ~ | Y | Y | Y |
| Long Distance (Wood) | Y | ~ | ~ | Y | Y | ~ |
| Music/Speech/Noise | Y | Y | Y | Y | Y | Y |
| Metal | Y | Y | ~ | Y | Y | Y |
| Glass | Y | ~ | N | Y | ~ | N |

Per User Accuracy

| | Finger Tap | Finger Swipe | Finger Fling | Nail Tap | Nail Swipe | Nail Fling |
|---|---|---|---|---|---|---|
| Finger Tap | 96.0 | 0.0 | 0.0 | 0.0 | 0.0 | 4.0 |
| Finger Swipe | 2.0 | 98.0 | 0.0 | 0.0 | 0.0 | 0.0 |
| Finger Fling | 0.0 | 0.0 | 98.0 | 2.0 | 0.0 | 0.0 |
| Nail Tap | 0.0 | 0.0 | 0.0 | 100.0 | 0.0 | 0.0 |
| Nail Swipe | 0.0 | 0.0 | 0.0 | 0.0 | 100.0 | 0.0 |
| Nail Fling | 0.0 | 0.0 | 0.0 | 0.0 | 0.0 | 100.0 |

FIG. 8A

Across User Accuracy

| | Finger Tap | Finger Swipe | Finger Fling | Nail Tap | Nail Swipe | Nail Fling |
|---|---|---|---|---|---|---|
| Finger Tap | 88.3 | 3.3 | 3.3 | 1.7 | 0.0 | 3.3 |
| Finger Swipe | 5.0 | 86.7 | 1.7 | 5.0 | 0.0 | 1.7 |
| Finger Fling | 0.0 | 0.0 | 100.0 | 0.0 | 0.0 | 0.0 |
| Nail Tap | 0.0 | 0.0 | 5.0 | 95.0 | 0.0 | 0.0 |
| Nail Swipe | 5.0 | 3.3 | 0.0 | 3.3 | 88.3 | 0.0 |
| Nail Fling | 0.0 | 1.7 | 0.0 | 3.3 | 3.3 | 91.7 |

FIG. 8B

Across User Accuracy with Augmentation

|  | Finger Tap | Finger Swipe | Finger Fling | Nail Tap | Nail Swipe | Nail Fling |
|---|---|---|---|---|---|---|
| Finger Tap | 95.2 | 2.9 | 0.1 | 0.1 | 1.0 | 0.8 |
| Finger Swipe | 1.7 | 97.0 | 0.0 | 0.1 | 0.3 | 0.8 |
| Finger Fling | 0.1 | 0.0 | 99.4 | 0.3 | 0.2 | 0.0 |
| Nail Tap | 0.1 | 0.1 | 0.8 | 98.0 | 0.7 | 0.4 |
| Nail Swipe | 0.9 | 0.4 | 0.1 | 0.9 | 96.0 | 1.7 |
| Nail Fling | 0.5 | 0.8 | 0.0 | 0.1 | 1.3 | 97.4 |

FIG. 8C

| Question | Mean (Depth) | SD (Depth) | Mean (TableSAW) | SD (TableSAW) |
|---|---|---|---|---|
| I felt that inputs happened when I did not want them to happen. (7=agree,1=disagree) | 5.8 | 1.3 | 1.4 | 0.5 |
| How exhausting did you find using this method for the tasks? (7=very exhausting, 1=not at all exhausting) | 6 | 0.7 | 2.4 | 0.9 |
| I felt that I had full control over the input method. (7=full control,1=no control) | 2.8 | 1.5 | 5.8 | 0.4 |
| How reliable did you find this method to be? (7=very reliable, 1=not at all reliable) | 2.6 | 1.5 | 6.4 | 0.9 |
| I was physically comfortable using this system. (7=very comfortable, 1=not at all comfortable) | 2.4 | 1.1 | 6 | 0.7 |
| It was easy to perform the task using this system. (7=very easy, 1=not easy) | 2 | 0.7 | 6 | 0.7 |
| The system did not register input at times when I wanted it to. (7=agree, 1=disagree) | 5.2 | 1.8 | 3.6 | 1.7 |
| How would you rank the system? (1=better, 2=worse) | 2 | 0.0 | 1 | 0.0 |
| Any comments on this system? | N/A | N/A | N/A | N/A |

FIG. 9

LEVERAGING SURFACE ACOUSTIC WAVE FOR DETECTING GESTURES

CROSS-REFERENCE TO RELATED APPLICATIONS

This application claims the benefit of U.S. Provisional Application No. 63/421,233, filed on Nov. 1, 2023. The entire disclosure of the above application is incorporated herein by reference.

FIELD

The present disclosure relates to techniques for detecting gestures.

BACKGROUND

Hands are one of the most natural ways users interact with the physical world, express themselves, and interact with computing devices. Effective methods of capturing detailed user gestures and object touch events promise to enable rich user interfaces for consumer electronics, Internet of Things (IoT), mobile devices, toys, etc. This is especially true for Augmented Reality (AR) and eXtended Reality (XR) applications where it is desirable to know the precise timing of when and how a user interacts with objects, in order to seamlessly overlay virtual content on the physical world.

Existing methods for capturing the precise timing of user touch and interaction events typically require heavy instrumentation of the environment, instrumenting the user's hands, or high fidelity optical tracking of the user's hands and objects. For example, virtual reality gloves and controllers can detect the precise moment a user touches a table to enable applications like virtual buttons and keyboards. However, this is a relatively high instrumentation burden that limits the users' ability to touch and feel natural surfaces, and in the case of the controller, grasp and manipulate everyday objects. Likewise, instrumenting the surface that the user interacts with incurs its own penalty if large portions of the object must be augmented with specialty sensors that may change the surface's texture and feel.

In contrast, passive methods of identifying user object interaction events do not require the instrumentation of either the user or the object's surface. The most dominant passive approach is computer vision-based hand tracking, which can reconstruct the pose and orientation of the users' hands in 3-D space. While this method has shown impressive results, critical edge conditions still limit its applicability to identify specific user-object interaction events. For example, the object of interest may be occluded by the hands or fall outside the cameras' field of view. Furthermore, 3D depth cameras based on stereo vision, time of flight, structured light, etc., are limited in their ability to resolve small changes in depth. This limitation in depth resolution makes it highly challenging to differentiate between hovering over a surface vs. touching a surface, causing false detection of touch events resulting in poor user interfaces. To overcome these limitations, it is desirable to deploy a sensing modality that can precisely identify minute hand gestures without requiring extensive user instrumentation or physically changing the object's surface.

This disclosure investigates the phenomena of surface acoustic waves (SAWs) along with methods for capturing these signals to robustly detect human-object interaction events and create gesture interfaces that require minimal instrumentation overhead. Surface acoustic waves have unique propagation characteristics fundamentally different from sound or mechanical vibration, enabling long detection ranges with isolation from background audio noise.

This section provides background information related to the present disclosure which is not necessarily prior art.

SUMMARY

This section provides a general summary of the disclosure, and is not a comprehensive disclosure of its full scope or all of its features.

A system is presented for detecting gestures. The system is comprised of: a contact microphone and a signal processor. The contact microphone is attached to a surface of interest of an objection and is configured to measure surface acoustic waves traveling along the surface of interest. The signal processor is interfaced with the contact microphone and is configured to receive a signal from the contact microphone, where the signal is indicative of surface acoustic waves traveling along the surface of interest. The signal processor operates to identify a gesture made by a person on the surface of interest using the signal.

In one embodiment, the contact microphone measures surface acoustic waves having a frequency in range of zero to 10,000 Hertz and the signal processor extracts features from the signal in a frequency range of zero to 10,000 Hertz. More specifically, the extracted features are defined as Mel-frequency cepstral coefficients allocated to 128 mel filter banks. The extracted features may be classified using machine learning, such as random forest methods. For demonstration purposes, the extracted features are classified as one of a finger tap, a finger swipe, a finger fling, a nail tap, a nail swipe or a nail fling.

In another aspect of this disclosure, the system detects surface events, such as placement of kitchenware of a surface, operation of an appliance, or other cooking-related events.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Senses of hearing and touch allow one to perceive acoustic waves through the air as sound and through solid objects as vibrations. In addition, when an object, such as a finger, comes in contact with a surface, the impact causes a transfer of kinetic energy that also creates surface acoustic waves (SAWs), which have unique propagation properties that can be exploited for on-surface sensing if the correct sensor is chosen to capture the waves.

When a user taps on a table, their finger creates a transfer of kinetic energy into the material, which launches 1) an acoustic wave that travels through the air as sound 2) a 3-dimensional mechanical wave that travels through the bulk of the medium (i.e., the table) as vibrations and 3) a 2-dimensional surface acoustic wave which is coupled to the surface-to-air boundary of the object and thus propagates along the surface. Surface acoustic wave (SAWs) are a sub-class of acoustic waves that are an amalgamation of several propagation mechanisms, namely, Rayleigh waves that include both longitudinal and transverse propagation components and Love waves that are horizontally polarized surface waves.

These wave propagation modalities offer unique features which can be exploited for sensing. Most notably, since SAWs are coupled to a two-dimensional surface, their in-plane amplitude decays at a rate of $1/\sqrt{r}$ (where r is the radial distance from the source impact). Compared to bulk mechanical waves (i.e., vibrations) that propagate in three dimensions as they travel through the body of the object and decay at a rate of $1/\sqrt[3]{r}$, SAWs propagate for longer distances. As will be shown below, SAWs can be detected nearly anywhere on the surface of a table due to their low rate of attenuation. Additionally, since SAWs are only generated through direct mechanical contact, they provide significant benefits when used for sensing than other free air acoustic signals (i.e., sound). For example, traditional microphones easily pick up unwanted ambient noise such as background music and people talking and can corrupt audio-based sensing applications. However, when free-air sound waves impact surfaces, they do not launch SAWs. In other words, there is no transfer mechanism from sound to surface acoustic waves. Thus, background noise does not corrupt or interfere with SAWs propagating along the surface of an object, making for a unique sensing modality that is robust to noisy environments.

Three sensing approaches will be explored in this disclosure. First, a traditional MEMS analog microphone in a standard surface mount package (3.50 mm×2.65 mm) is explored. These microphones have an exposed port to let sound into the MEMS diaphragm and typically have a frequency response of 20 Hz to 20 kHz. Second, a surface mount (3 mm×3 mm) 3-D accelerometer capable of measuring vibrations is explored. Inertial Measurement Units (IMUs) and, by extension accelerometers, are one of the most ubiquitous sensors as they are often included in smartphones, wearables, and IoT devices as an easy way to capture 3D motion information. However, one drawback with accelerometers is that the signal noise increases significantly as the sampling frequency increases. For reference, a premium low-noise, high-frequency accelerometer (Analog Device ADXL1001) can only maintain a high-fidelity operation up to 4.7 kHz, resulting in 2.4 kHz bandwidth. Additionally, a more commonly used accelerometer (STMicroelectronics LSM9DS1) found in the Arduino Nano 33 Sense can sample reliably up to 500 Hz (250 Hz BW).

Third, a specially designed Voice Pick Up (VPU) sensor that operates similarly to a bone conducting microphone is explored. VPU sensors can capture the wearer's voice through the body in the presence of noisy environments. In this device, the sound port is hermetically sealed, and a mass-spring diaphragm is added to create a contact microphone that is shielded from external sounds, such as from the environment. This effectively creates a MEMS contact microphone with a much broader frequency response (10 kHz) than alternative sensing approaches, such as geophones (1 kHz), while retaining the small size, standard analog interface, and cost benefits of traditional MEMS audible microphones. For the first time, this disclosure will explore the use of a MEMS contact microphones for capturing surface acoustic waves. These three sensing modalities (traditional microphone, accelerometer, and MEMS contact microphone) will be used to characterize their ability to capture surface-to-hand interaction signals across different materials, background conditions, and at different sensing distances.

A series of experiments were conducted to evaluate four essential characteristics of any sensing approach: 1) signal expressivity, 2) signal fidelity across distances, 3) signal fidelity across environmental conditions, and 4) signal fidelity across materials. As a reference to similar sensors, an LSMD91 IMU (via Arduino Nano 33 Sense) and a UMA-8 Microphone were placed in line with the MEMS contact microphone and signal from each were captured simultaneously. For the LSMD91 IMU, the sampling frequency was set to 476 Hz to minimize noise. As a point of reference, the typical maximum sampling rate for Android devices is 200 Hz. For the UMA-8, the sampling rate was set to the maximum 48 kHz, the beamforming capabilities disabled, and the channel corresponding to the microphone closest to the interaction event was selected. For the MEMS contact microphone, the values were sampled using an ADC and the sampling rate set to match the UMA-8. The positive values of the captured waveforms were only plotted for compact visualization purposes.

For signal expressivity, start with three common hand-to-surface gestures to better understand signal expressivity: taps, swipes, and flings. Each gesture is modeled after tablet touchscreen gestures: taps are of short duration with no dwell, swipes are 5 cm in displacement, and flings are 1 cm displacement. Since each gesture can use both the finger's fleshy surface and the finger's nail, each gesture is performed both ways, resulting in six total gestures. For this evaluation, place all three devices on a wooden table, mark a location 13 cm away, and perform each gesture.

While all three sensors can capture the signal from both kinds of taps, only the microphones show significant differences between finger vs. nail. For the much more subtle swipe and fling gestures, the regular microphone struggled to capture the gesture above the noise floor. The accelerometer captured some of these events, albeit with much lower resolution. The MEMS contact microphone was able to capture the gesture for both faithfully. Overall, regarding signal expressivity, one can see that the MEMS contact microphone can robustly capture all six gestures and thereby provide an extra input dimension of finger vs. nail.

For signal fidelity across distances, an important feature for any surface-based contact sensor is capturing the signal from a sufficient distance in order to create an appropriately sized interactive area. To evaluate signal fidelity across distances, drop a small glass marble (5.5 grams, Dia=1.5 cm) from a height of 5 cm on a wooden table in order to create a standardized and repeatable impulse. Mark out distances of 5, 8, 10, 13, 23, 28, 46, 56, 69, 84, 104, and 130 cm. For each distance and sensor, calculate the peak amplitude of the impulse.

Figure 1:
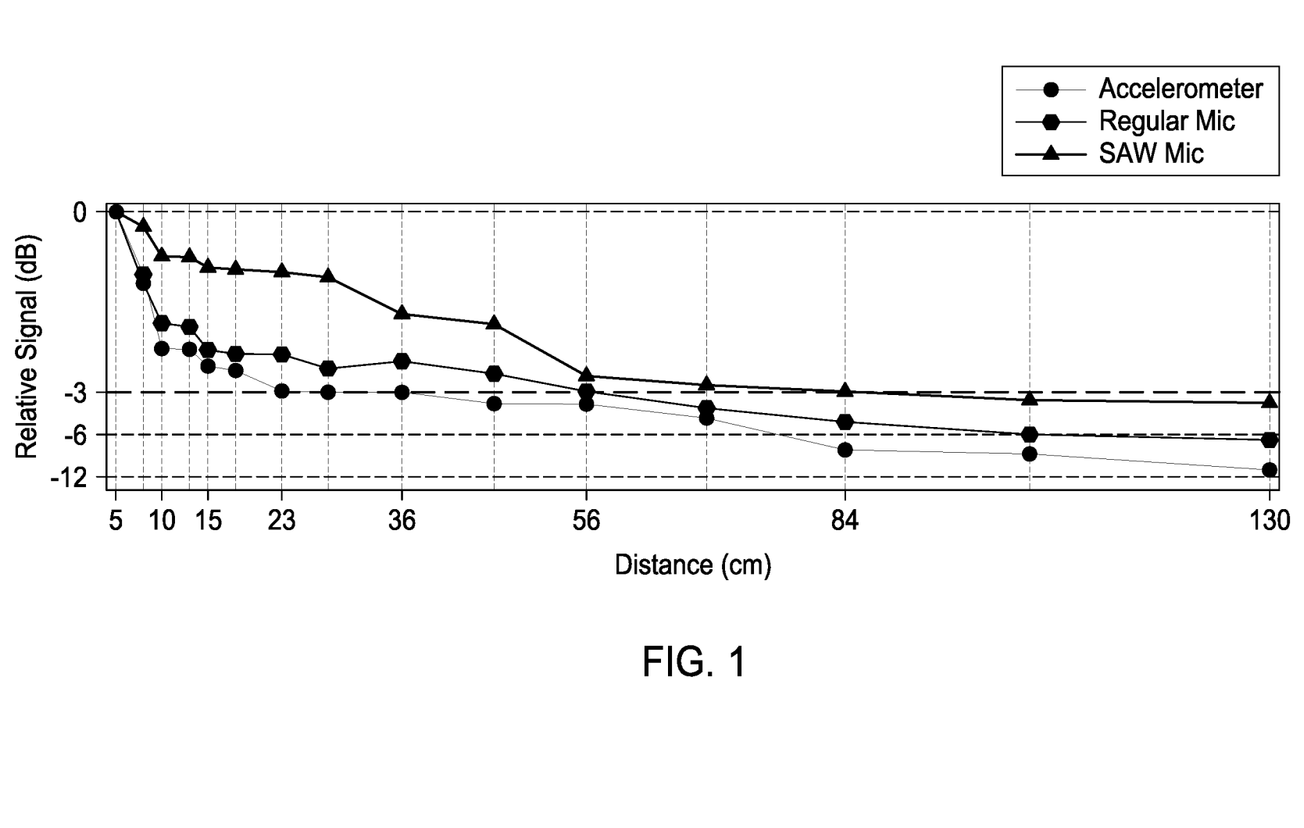
FIG. 1 is a graph showing the relative signal peak of a marble drop across various distances for three sensors with horizontal line denoting −3 dB.
Figure 2A:
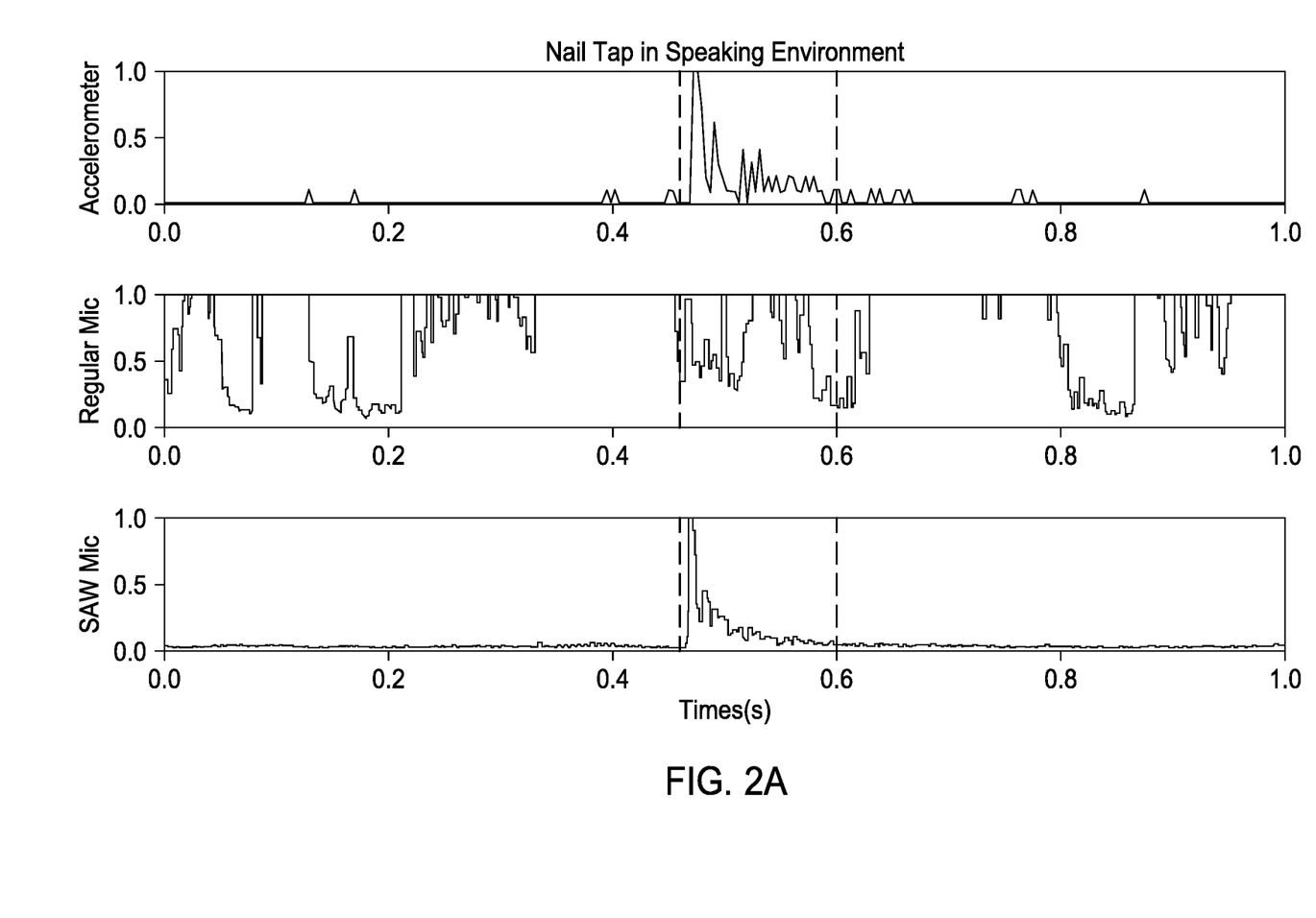
FIG. 2A are graphs showing the time-domain signal from three sensors featuring a nail tap in a speaking environment.

FIG. 1 shows the relative signal peak in dB with a −3 dB reference line. While all sensors were able to capture the impulse with a signal strength above −12 dB at 130 cm, the MEMS contact microphone only dips below −3 dB at 84 cm, almost double the distance vs. the accelerometer. Additionally, peak signal strength is only one parameter of overall signal fidelity. When one examines the raw signals at 130 cm, one can see that only the regular microphone and contact microphone are able capture the bounces at 130 cm. With reference to FIG. 2C, these results indicate that it is possible to instrument a single point and measure interaction events over an entire table's surface using the contact microphone.

For signal fidelity across environmental conditions, another critical feature of a sensor is the ability to operate in various environments. For this evaluation, a nail tap was performed on a wooden table at 13 cm in three conditions: a quiet environment, an environment where music is introduced, and an environment where speech is introduced. The music was played at a reasonable volume and a normal speaking voice was used, adjacent to the table. FIG. 2A shows the raw time-domain plot (min/max scaled) of each sensor for the speaking environment. Unsurprisingly, the accelerometer maintains robustness to environmental noise while the regular microphone also captured the background music and people speaking, effectively burying the nail tap. The MEMS contact microphone was robust to the environmental noise and did not capture either music or speech.

For signal fidelity across materials, a robust sensor needs to capture events across a variety of surface materials. Four common surfaces were selected: a wooden table, a glass table, a metal table, and an Ikea particleboard table. A finger tap and finger swipe were performed consecutively from 13 cm.

Figure 2B:
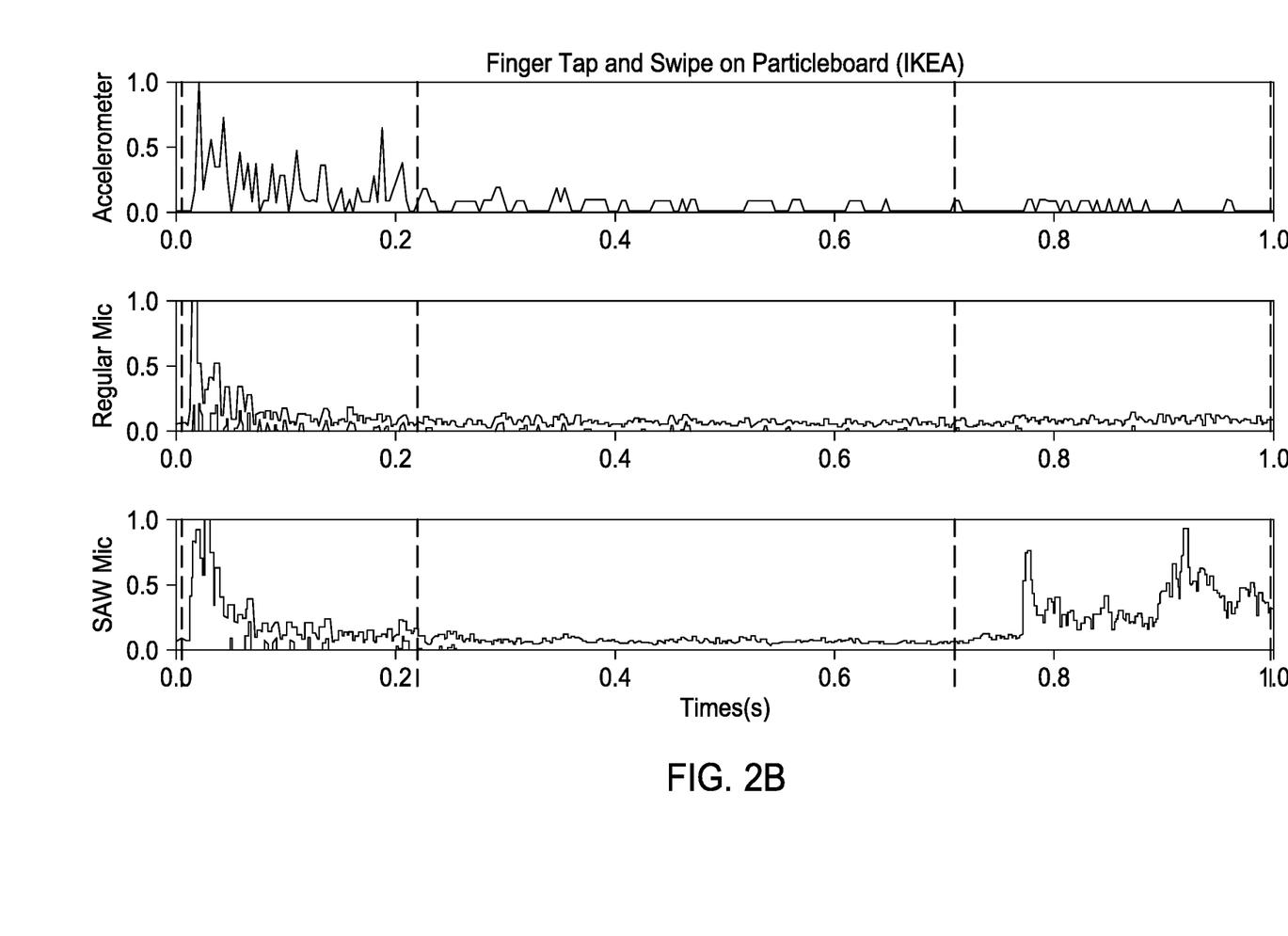
FIG. 2B are graphs showing the time-domain signal from three sensors featuring a finger tap and swipe on particleboard.
Figure 2C:
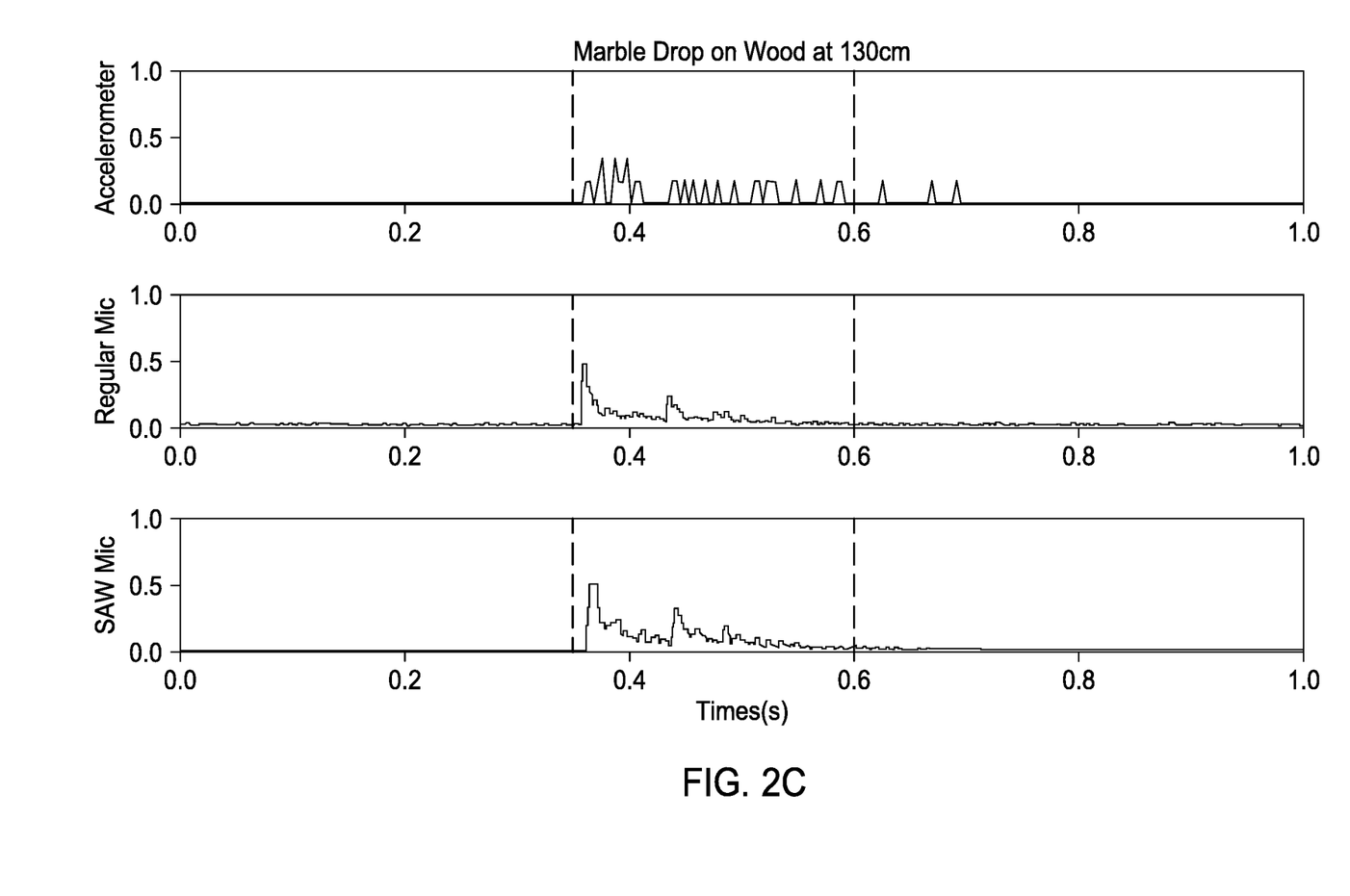
FIG. 2C are graphs showing the time-domain signal from three sensors featuring a marble drop on wood.

FIG. 2B shows the raw time-domain plot (min/max scaled) of each sensor on particleboard. One can see that all sensors can capture taps. However, swipes appear to have a strong relationship with the texture and friction of the material. More textured/friction surfaces, like wood and particleboard, create stronger signals for all sensors than their smooth metal and glass counterparts. As a result, the accelerometer and regular mic struggle to capture swipes on all but wood. The contact microphone shows the most robustness across materials and captures a strong signal on wood and particleboard, moderately on metal, but faintly on glass.

Figure 3:
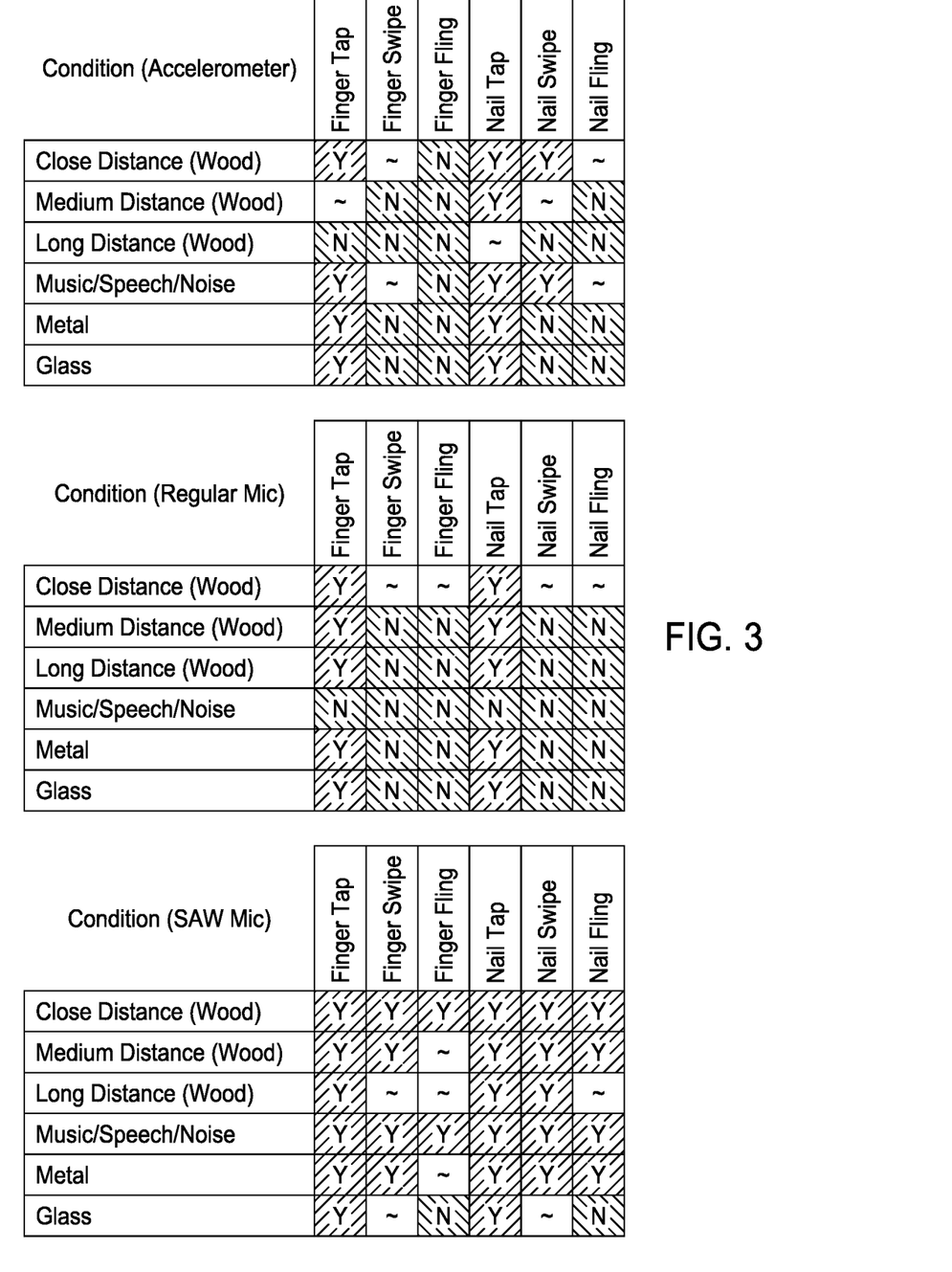
FIG. 3 is a chart illustrating a qualitative summary of experiments for example distances, situations and materials for all three sensors.

Overall, these experiments show that the contact microphones combine the advantages of regular microphones (distance performance, expressivity) and the robustness of accelerometers to environmental noise while presenting their own unique characteristic, such as capturing very subtle signals on a variety of materials. The results of these experiments are qualitatively summarized in FIG. 3, which includes three charts: one for the accelerometer, the regular microphone, and the MEMS contact microphone (aka SAW Mic). Based on the measurements of the signal to noise ratio, each test condition is rated as either 'NI' Not Useful (red background) indicating insufficient signal for event detection, a '~' weak signal (yellow background) indicating that under certain circumstances the signal can be used for event detection, and 'Y' for Yes (green background), indicating there is a strong signal to noise ratio for this test condition and if the system is likely to work robustly for touch and gesture event detection.

Figure 4:
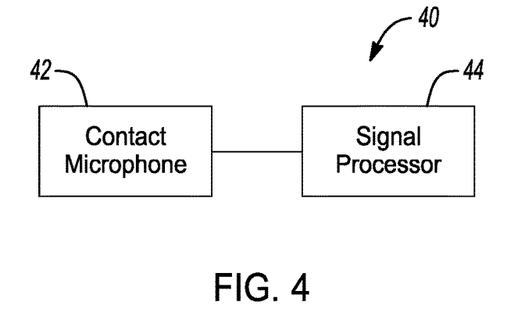
FIG. 4 is a block diagram of a system for detecting gestures in accordance with this disclosure.

FIG. 4 depicts an example system 40 for detecting gestures using surface acoustic waves traveling along a surface of interest. The system 40 is comprised generally of a contact microphone 42 and a signal processor 44. The contact microphone 42 is attached to a surface of interest of an object. For example, the object may be a table, such that the top of the table is a hard planar surface of interest. Other types of objects and other types of surfaces are contemplated by this disclosure; some of which are described below.

The contact microphone 42 is configured to measure surface acoustic waves traveling along the surface of interest. In one embodiment, the contact microphone 42 has a diaphragm disposed in physical contact with the surface of interest and hermetically sealed therein. The contact microphone 42 preferably measures surface acoustic waves having a frequency range of zero to 10,000 Hertz.

The signal processor 44 is interfaced with the contact microphone 42 and configured to receive a signal from the contact microphone 42, where the signal is indicative of surface acoustic waves traveling along the surface of interest. The signal processor 44 in turn operates to identify a gesture made by a person on the surface of interest using the signal. This disclosure envisions different techniques for identifying a gesture using surface acoustic waves.

In the example embodiment, the signal processor 44 extracts features from the signal from the contact microphone and classifies the extracted features using machine learning. As will be explained below, the extracted features are defined as Mel-frequency cepstral coefficients allocated to 128 mel filter banks. Random forest methods is one approach for classifying the extracted features although other machine learning methods fall within the scope of this disclosure. For illustration purposes, the extracted features are classified as one of a finger tap, a finger swipe, a finger fling, a nail tap, a nail swipe or a nail fling. Likewise, other gesture types also fall within the scope of this disclosure.

In an exemplary embodiment, the signal processor 44 is implemented as a microcontroller. It should be understood that the logic for the control of the system by the signal processor 44 can be implemented in hardware logic, software logic, or a combination of hardware and software logic. In this regard, signal processor 44 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that signal processor 44 performs a function or is configured to perform a function, it should be understood that signal processor 44 is configured to do so with appropriate logic (such as in software, logic devices, or a combination thereof).

Figure 5:
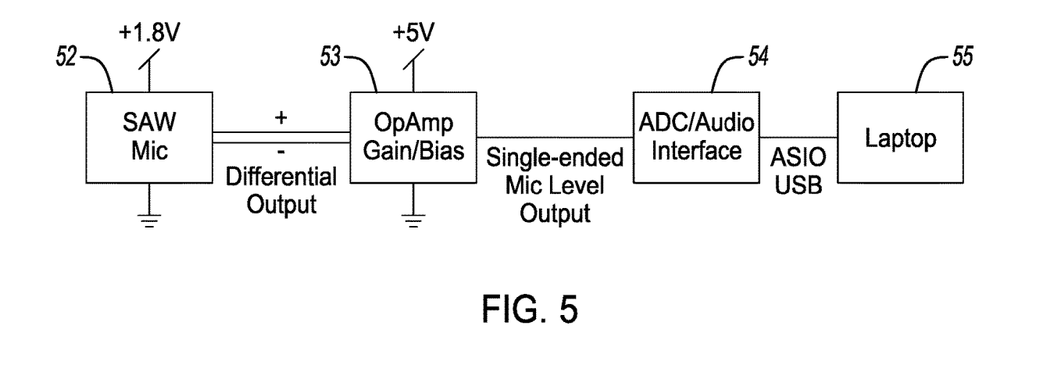
FIG. 5 is a block diagram of an interface circuit between a contact microphone and a signal processor.

FIG. 5 depicts an example interface for a contact microphone 52. The interface circuit includes an op-amp circuit 53 and an analog-to-digital converter 54 interfaced between the contact microphone 52 and a signal processor 55, such as a laptop computer. This circuit converts the differential signal to a single-ended output and provides an adjustable gain and bias to match a given analog-to-digital converter (ADC), such as at "Mic level". This flexibility allows one to use both general-purpose ADCs and standard audio inputs to digitize the incoming signal. All of these circuit components can be placed on a single circuit board (e.g., 12 mm×15 mm PCB).

Early prototyping found that strong taps could bounce or move the sensor without any weight on the contact microphone, yet too much pressure would dampen signals from subtle gestures like flings. To provide more consistent contact with a surface, a small housing was fabricated that allows the contract microphone to pivot on a hinge, and washers can be added to increase the weight on the contact microphone. Overall, a reasonable balance was found with the added weight of the housing and a single washer (8.1 grams).

Surface acoustic wavesignals may include high-frequency components that are useful for machine learning classification tasks. Thus, the contact microphone is preferably paired with a high-frequency ADC to collect a small pilot dataset of the six gestures noted above. To collect data, a single participant is used in a quiet home-office environment and ten instances of each gesture are collected as a pilot dataset from a 13 cm distance on an Ikea particleboard table. This dataset was collected at 192 kHz 32-bit to ensure robust capture of high-frequency and small signals. A simple RMS-based threshold was used to determine the onset of the gesture and trim silence from each instance.

Figure 6:
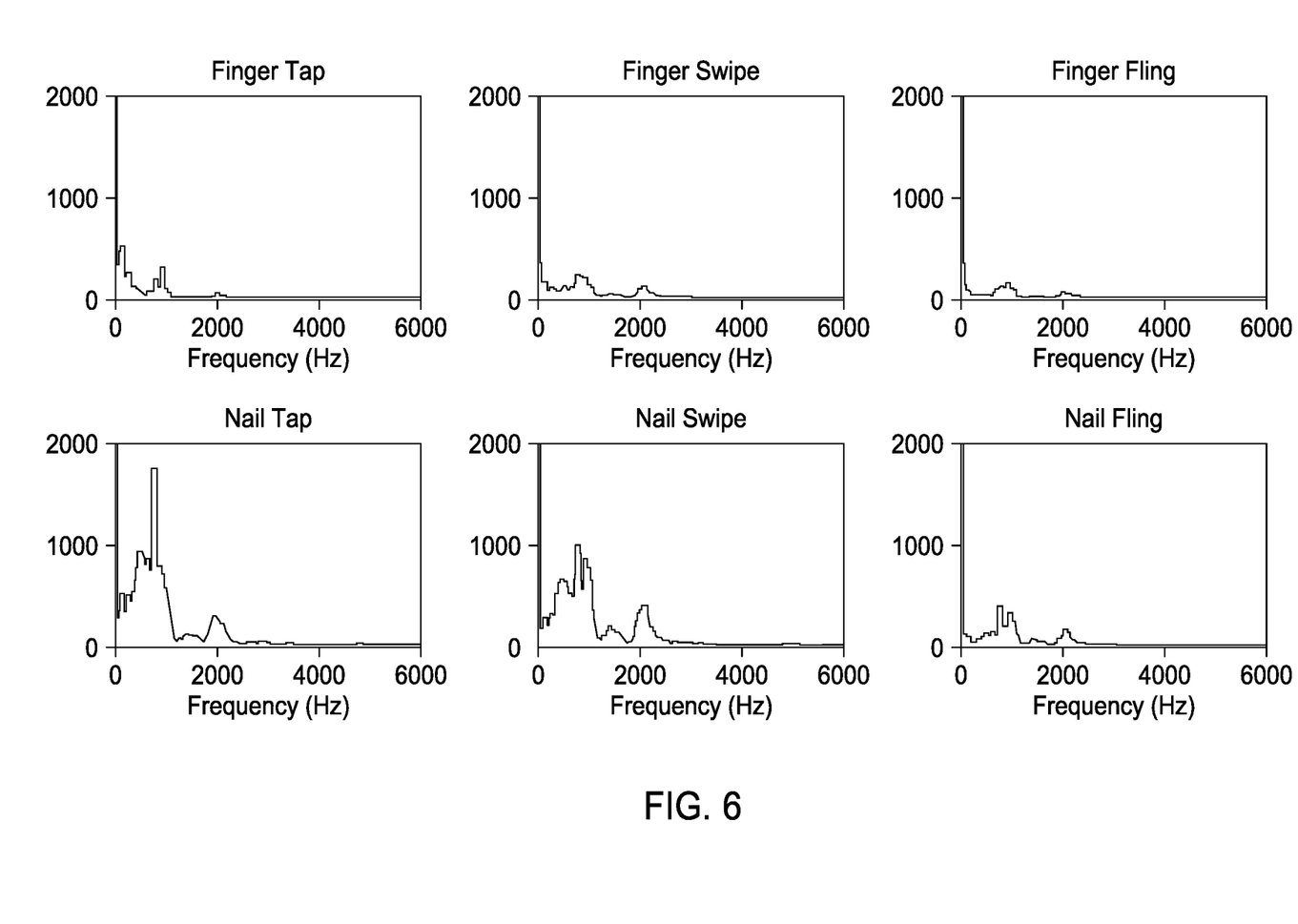
FIG. 6 are graphs showing the average FFTs across all 10 instances for each gesture, demonstrating significant difference in frequency content between both individual actions and finger vs. nail.

Using this dataset, a high-resolution clip-length Fast Fourier Transform (FFT) was performed with a 0.67 Hz step size from 0 Hz to 96 kHz. FIG. 6 shows the average FFT for each gesture. Overall, one sees most of the significant frequency components for each gesture under 6,000 Hz. However, the presence of a frequency component does not necessarily mean that it is useful for classification tasks. Additionally, a high-resolution FFT would create many features, potentially slowing down classification performance. Thus, it is desirable to find a way to represent the most valuable frequency bands and capture the greatest amount of information while using fewer features.

Figure 7:
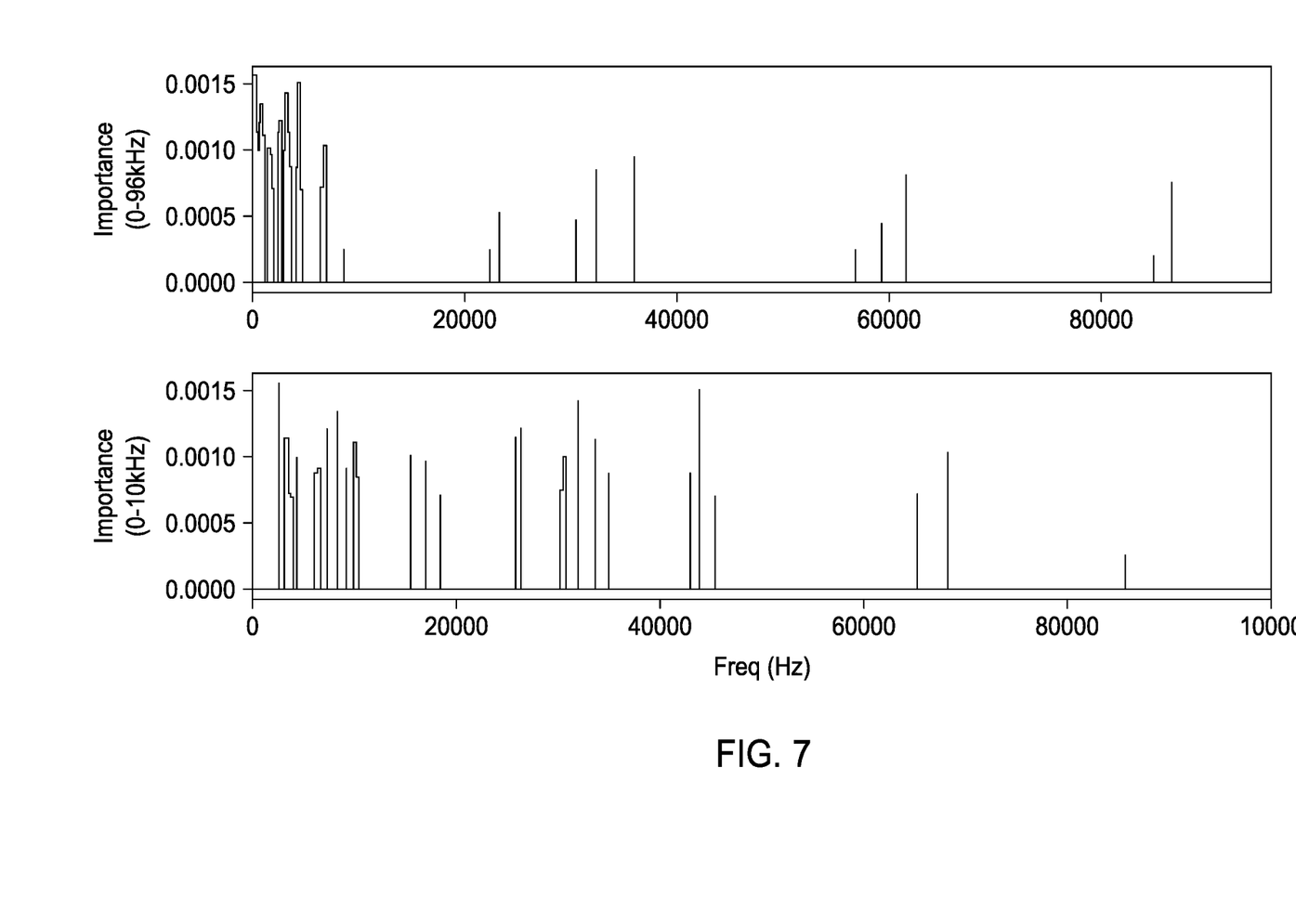
FIG. 7 are graphs showing the feature importance for six gestures from 0-96 kHz and 0-10 kHz, respectively.

While there are many approaches to perform feature selection, Gini Impurity offers a closely related metric to actual classification performance. In an example embodiment, a Random Forest classifier is used to generate Gini Impurity for each frequency bin using the high-resolution FFT. FIG. 7 shows the feature importance from 0-96 kHz and from 0-10 kHz. Note that 82% of the total feature importance is under 10 kHz. Also, note that 68% of the total importance is under 4 kHz. Overall, the distribution of feature importance appears to be logarithmic.

Given the distribution of the feature importance, MFCCs is an appropriate choice to featurize SAW signals. However, the traditional mel-scale does not allocate features in the frequency ranges that would maximize the capture of important frequency bands. Fortunately, the Python library, librosa, can efficiently implement a highly-optimized custom MFCC (cMFCC) to allocate 128 mel filter banks from 0 Hz to 10 kHz with a hop length of 25 ms; this customized approach is referred to herein as cMFCC. A clip-length cMFCC is created by summing all components over time. The cMFCC reduces the feature size from 14,925, when only using a subset (0 Hz-10 kHz) of the high-resolution FFT, to 128 while representing the same frequency ranges and a comparable amount of information. Other feature extraction techniques may also be suitable for this application.

To determine the preliminary effectiveness of the proposed system, including cMFCC feature extraction, a 50% train/50% test class-balanced and shuffled split is performed. Using a Random Forest (SciKit-Learn, default parameters) on an Intel i7-11800H, one finds an accuracy of 96.6% with the entire high-resolution FFT (0 Hz-96 kHz) as features. The prediction time for each sample is 30 ms. Using the same train/test split, the 128-cMFCC (0 Hz-10 kHz) provides an accuracy of 95.0% with a 17 ms prediction time: almost half the computation time while incurring a marginal reduction in performance. One finds the individual class accuracy distribution to be similar for both. To confirm the cMFCC functions with other ML approaches, this evaluation is repeated using a Linear SVM which yielded 90.0% and 91.6% accuracy for the FFT and cMFCC, respectively.

Since cMFCC only relies on frequencies less than 10 kHz and has no significant impact on preliminary classification accuracy, these findings support the use of traditional audio interfaces to digitize the analog output of the contact microphone. Audio capture devices use low latency ASIO drivers built into operating systems and can leverage many existing audio packages to capture and process SAW data, such as PyAudio. Thus, one can adjust the gain and bias to "Mic level", enabling the contact microphone to be directly plugged into standard Mic inputs.

While previous evaluations show promising results, the system described above was formally evaluated to recognize the six hand-to-surface gestures in a less controlled setting and with a broader set of participants, providing a more realistic representation of the system's overall performance.

Five participants were recruited and asked to perform each of the six gestures, creating a round. Each round was repeated 10 times, resulting in 10 rounds and 60 total instances per participant. Each participant was allowed to perform the gesture by what felt natural to them, allowing for variations in gesture location, force, and duration. While the same table was used across the entire evaluation, the device was removed and repositioned for each participant to add variety and realism to the dataset. The dataset was collected over three days, during which the table was moved. This dataset is used as the basis of the evaluations below.

Figure 8A:
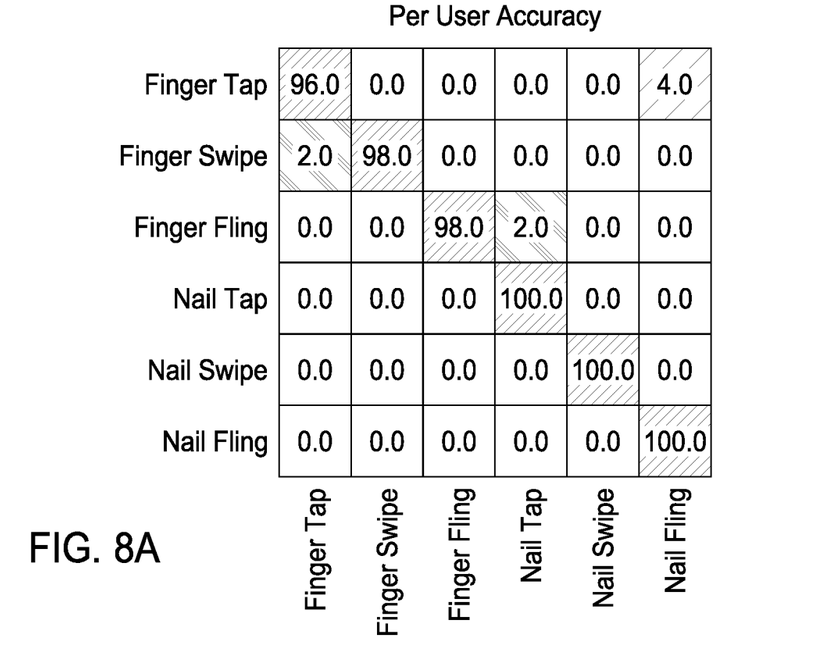
FIGS. 8A-8C are confusion matrices showing classification accuracy for six gestures: per user, across users and across users with synthetically augmented training data, respectively.

First, evaluate the per-user accuracy by training the system on nine rounds and testing on the 10th. Repeat this process for all combinations and compute the average result per participant. Across all participants, a mean per-user accuracy of 98.6% (SD=1.24%) was found. The mean confusion matrix can be found in FIG. 8A. Observe that nail-based gestures had higher classification accuracy than their finger-based counterparts, but all gestures had 96% accuracy or better.

A more challenging evaluation is determining how effective the system can perform when A) gestures are performed differently by different people and B) the device's position has moved relative to the gesture area. This "generalized" accuracy is evaluated by training the system on four participants' data and testing on the 5th person. Repeat this process for all combinations and report the average results.

Figure 8B:
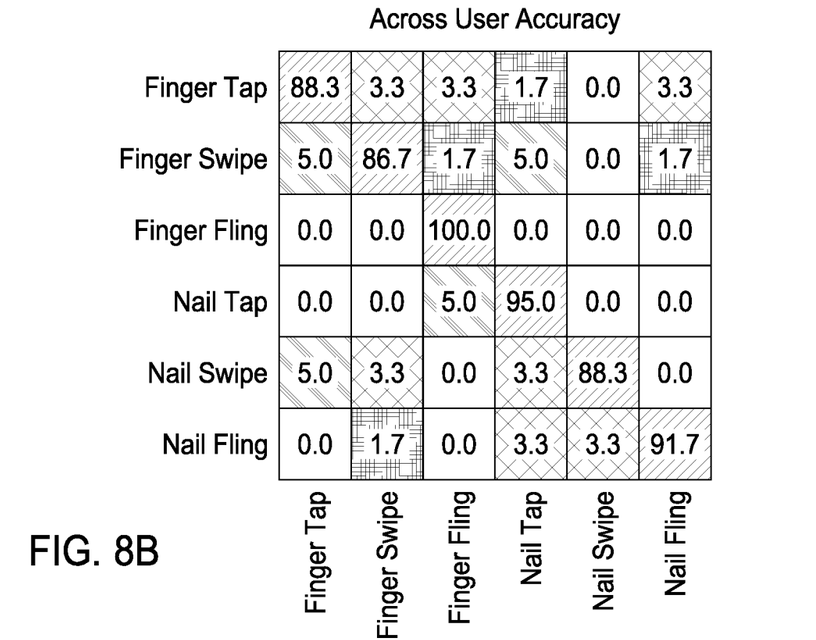

Overall, a mean accuracy of 91.7% (SD=2.97%) across all participants was found. The mean confusion matrix can be found in FIG. 8B.

This relatively poor performance can be attributed to the size of the small dataset. Significant variations were observed in how each participant performed the gesture (e.g., pressure, location, duration), and four participants might not offer sufficient variety to provide a robust training set for an unknown participant. It was observed that 47% of the total error was attributed to finger vs. nail errors. When one removes this distinction (i.e., label both finger taps and nail taps as just taps), an accuracy across-user accuracy 95.0% (SD=2.86%) was observed.

Traditional audio augmentation approaches to improve model robustness to real-world user conditions were also explored. Additional synthetic data was generated from the real collected data, which can simulate a variety of different environmental noise, users' touch duration, force, range, and surface textures to ensure the system can maintain high accuracy for previously unseen users and usage conditions. The Python package, Audiomentations, was used to create augmented versions of the dataset as follows:
(1) AddGaussianSNR (min_snr_in_db=0, max_snr_in_db=50, p=0.25) to simulate increased environmental noise.
(2) TimeStretch (min_rate=0.8, max_rate=1.25, leave_length_unchanged=True, p=0.25) to simulate different gesture durations.
(3) PitchShift (min_semitones=−4, max_semitones=4, p=0.25) to potentially simulate different materials.
(4) Gain (min_gain_in_db=−12, max_gain_in_db=12, p=0.25) to simulate different gesture force.

Figure 8C:
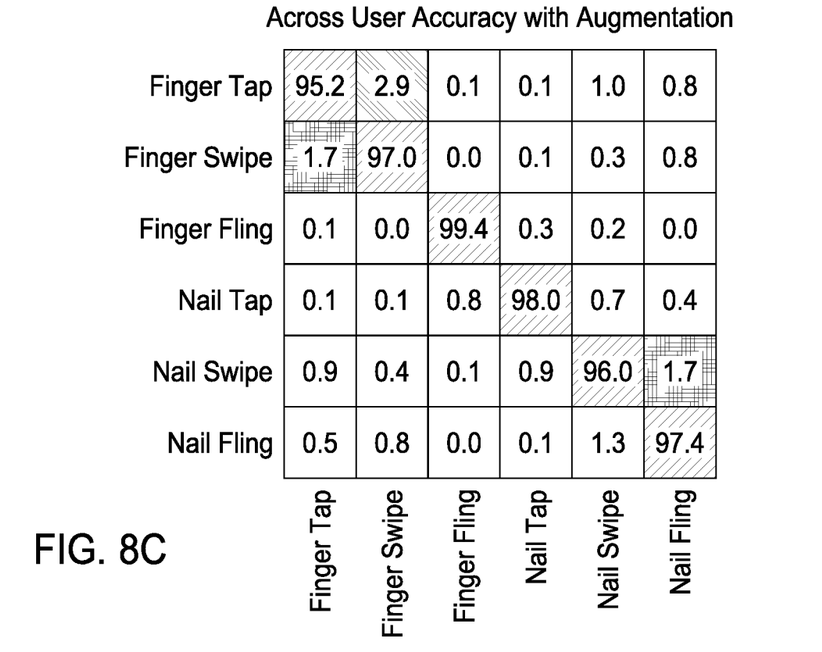

Using the original dataset, 100 instances were generated from each collected instance, resulting in 6000 instances per participant. Each instance was featurized using cMFCC. Given the much larger dataset, an MLP Classifier (SciKit-Learn, relu activation, adam solver, 6 layers: 1024, 512, 256, 128, 64, 32) was used, where train on all augmented instances of four participants and test on all augmented instances of the 5th for all combinations. An accuracy of 97.2% (SD=0.4%) was observed for all six gestures. The mean confusion matrix can be found in FIG. 8C. For reference, using a Random Forest model achieved an accuracy of 95.8% with augmentation. Thus, it was observed that traditional audio augmentation approaches can improve model performance for SAW classification tasks and reduce the data collection burden.

While the previous study evaluates the system's ability to recognize various surface gestures, the detection system 40 was also assessed to determine whether the system can improve the user experience in specific AR/VR environments and applications. An ongoing challenge for vision-based AR/VR applications is determining the exact moment a touch event occurs. While depth-based approaches have significantly improved experiences over prior dwell-based interactions, the resolution of depth cameras and computing heavy algorithms remains insufficient to precisely determine touch interactions. As a result, many AR/VR implementations place a virtual plane above a surface or object of interest. When the finger crosses that plane, it registers this event as a touch. The height of this plane can be tuned to compensate for the depth accuracy of the system. For example, the Intel RealSense D435 provides a depth accuracy of 2.5-5 mm at 1 m, which assuming a fingertip thickness of 10 mm, would require at least a virtual plane of 15 mm to trigger reliably. In order to evaluate the system's usefulness in complementing current vision-based approaches in AR/VR applications, a TableSAW-alone version and a RealSense depth-alone version of an AR Number Pad and an AR Paint application were implemented.

First, place a printed paper template of a number pad or paint drawing with an Aruco code on the table for both the AR Number Pad and AR Paint applications. The Aruco code allows one to register the location of the physical number pad/paint tracing and determine the plane of the table's surface, which then define a virtual plane above it. The RGB camera is used from the RealSense to determine the X/Y position of the tip of the index finger using MediaPipe's hand model. For the depth-based version of the two applications, it is registered as a touch when the finger dips below the virtual plane. It was found that a height of 1.5 cm above the desk reduced "Midas touch" behavior while remaining easy to trigger. In the TableSAW version, the detection system 40 would provide touch event detection.

Five participants were recruited and asked to complete the AR Number Pad and AR Paint tasks and randomized the order of the first task (i.e., 2 started with Paint, 3 with Number Pad). Within each task, participants were asked to complete the task six times, three for each of the two touch detection conditions, in a randomized order. The participants were not informed which condition, or the number of conditions, during the study. Both the RealSense and TableSAW remained in place for all six trials within a task. After completing all tasks, the participants were asked to complete a survey and provide qualitative feedback.

For the AR Number Pad task, each participant was asked to type in a 7-digit phone number (generated with random numbers) six times, three for each condition, in a random order (i.e., the conditions were interwoven to prevent the participant from learning the condition). A timer was started from the beginning of the task and ended upon entry of the last digit resulting in a correct phone number sequence. A delete key was provided on the number pad to erase a single erroneous entry per press, and the number of presses was recorded per trial. The number of times a false negative was observed when the participant tapped the surface, but the touch was not identified was also recorded.

For the depth-based condition, the average time to completion was 24.2 s per trial, with an average false-negative rate of 4.1× and 4.5× delete key presses. In trials with high false-negative rates, participants would sometimes inadvertently place their fingers underneath their hands, preventing an accurate depth estimation. It was also observed high delete key usage in trials resulting from erroneous and/or excessive number entries due to mistaking hovering for touching, especially when users would hover-glide their hand to the following key. For the TableSAW condition, the average time to completion was 17.7 s per trial, with an average false-negative rate of 0.9× and 0.7× delete key presses. Table 1 (top) provides summary statistics for the evaluation.

TABLE 1

| Number Pad | Mean (Depth) | SD (Depth) | Mean (TableSAW) | SD (TableSAW) |
| --- | --- | --- | --- | --- |
| False Negatives | 4.1 | 1.8 | 0.9 | 1.0 |
| Total Time (s) | 24.2 | 4.4 | 17.7 | 3.5 |
| Delete Keys | 4.5 | 3.9 | 0.7 | 0.9 |
| Paint | Mean (Depth) | SD (Depth) | Mean (TableSAW) | SD (TableSAW) |
| Extra Pixels | 95.3 | 45.8 | 24.9 | 14.2 |
| Total Pixels | 415 | 79.6 | 200.8 | 75.3 |
| Extra Rate | 21.9% | 7.6% | 13.2% | 8.1% |
| Total Time (s) | 51.3 | 22.0 | 48.1 | 25.3 |

Through surface acoustic wave sensing, TableSAW can more robustly detect finger taps without needing to rely on the imprecise placement of a virtual interaction plane of a vision-only depth-based solution.

For the AR Paint task, each participant was asked to trace the line drawing of a smiley face and Eiffel tower six times, 3 for each condition, in random order. If the finger was detected as in contact with the surface (under the virtual plane for depth, performing a tap/swipe for TableSAW) during the camera frame sampling, a single paint dot (5 mm diameter) was applied at the X/Y location of the fingertip. A timer was started from the beginning of the task and ended when the participant stated they were satisfied with their tracing. The participant was told they could ignore extra/erroneous paint and retrace the image if the paint was not applied. For each trial, the total number of paint dots applied and the number of erroneous paint dots applied outside of the trace with a distance greater than 15 mm from the nearest trace outline were tabulated.

For the depth-based condition, the average time to completion was 51.3 s, with 415 paint dots applied on average and a 21.9% "extra" pixel rate. For the TableSAW condition, the average time to completion was 52.3 s, with 200 paint dots applied on average with a 13.2% "extra" pixel rate.

Table 1 (bottom) provides summary statistics for the evaluation. The lower extra pixel rates for TableSAW suggests that it also generates fewer false positives, which can occur in the depth-based condition if the participant does not lift their finger high enough between strokes. This phenomenon was also observed in the average number of paint dots applied per trial, with the depth-based condition averaging more than double the TableSAW condition. Thus, with TableSAW, users can more confidently begin and end their strokes.

Figure 9:
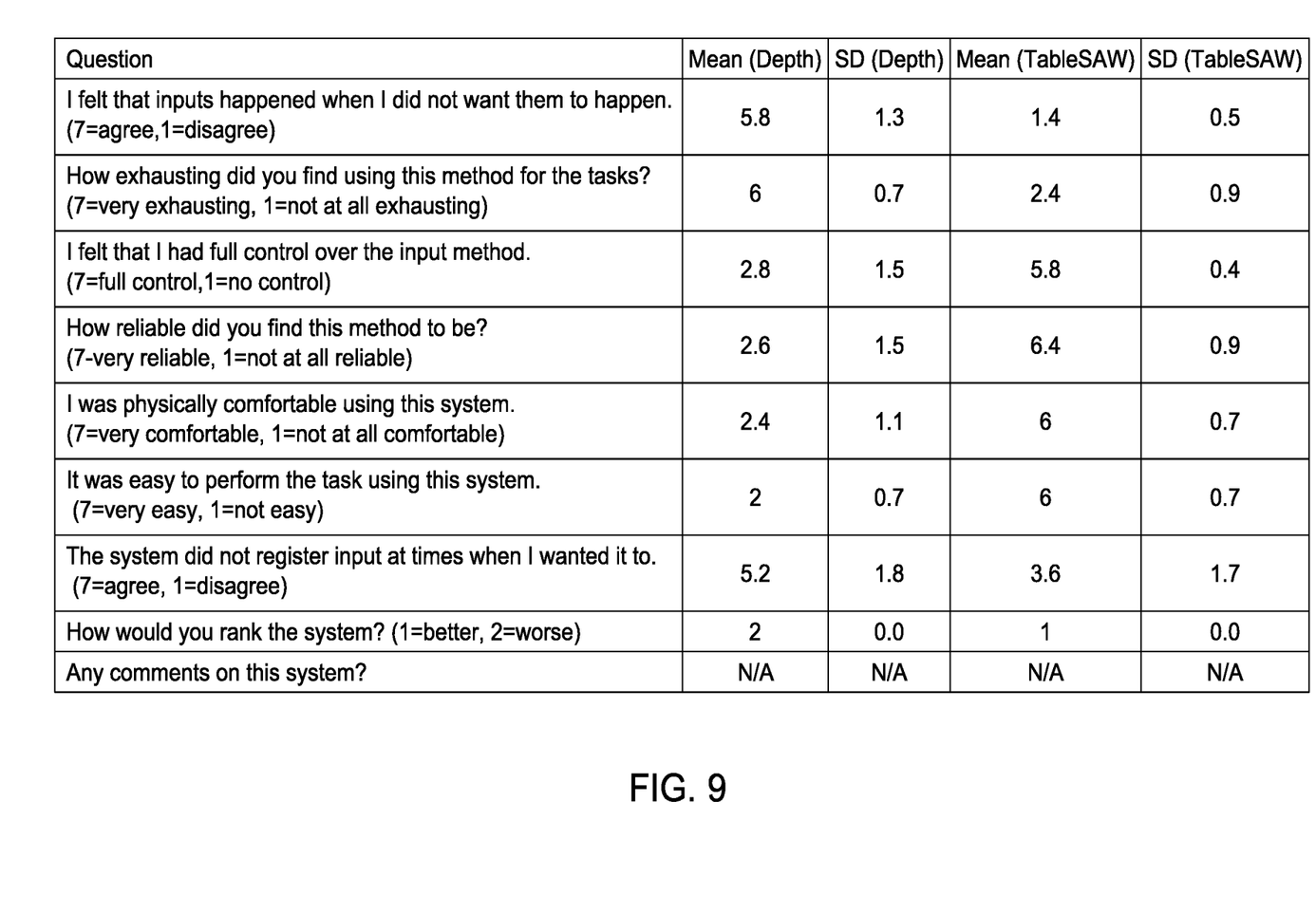
FIG. 9 shows the questions asked using a 7-point Likert scale and summary statistics for the qualitative survey.

After completing both tasks for both conditions, the participants were asked to complete a qualitative survey. First, the participants were asked how many different conditions they thought were being tested. Three out of the participants stated that they observed two conditions, and the remaining two stated they observed three conditions. After this question, it was revealed that there were two conditions, Condition "A" (the depth-based condition) and Condition "B" (the TableSAW-based condition). The participants were allowed to reuse both systems to re-familiarize themselves with "A" and "B". The participants were not told the sensing mechanism of "A" and "B" so as to not bias their judgment. Then, the participants were asked questions about Condition "A" and Condition "B" using a 7-point Likert scale. The questions and summary statistics can be found in FIG. 9. Overall, the participants unanimously found the TableSAW condition of these tasks preferable, particularly due to its consistency with recognizing inputs and minimizing false positives.

Free-form comments were also solicited on both conditions. General concerns regarding the depth-based condition were the false positives related to moving hands while in a low hover: "I think I was trying to keep my finger as far away as possible because it was still registering when my finger was close but not touching. I tried my best to adjust to this system." Regarding the reliability and comfort of using the systems, one participant reported, "Because I didn't know which one is which, there was a stark difference when I think system B was being used. I was happy that there was no false positive, and I didn't have to hit delete 100 times. I could tell there were differences, and I was relieved when I was using B instead of A." Regarding the overall user experience for the TableSAW-based condition, "It felt like normal drawing, felt more natural than paint flying all over the place." The qualitative results show that Table-SAW offers a beneficial complement to depth-based sensing alone for touch interactions on surfaces and improve novel surface typing methods.

While the majority of this disclosure has focused on AR and VR applications, surface acoustic wave sensing offers the ability to add touch and gesture interfaces to a wide range of electronic devices, such as laptops and smart speakers, home appliances, toys and furniture.

In another aspect, the system 40 is configured to detect surface events or activities in a similar manner. To demonstrate this aspect, the system was used to detect activities on a kitchen counter, such as placement of kitchenware (e.g., forks, mugs, etc.), operation of appliances (e.g., blender or mixer) and cooking-related events, such as chopping or peeling.

A number of appliances (food processor, stand mixer, blender, air fryer, coffee grinder, water boiler, microwave), cooking actions (whisking, opening microwave door, peeling, chopping), and placement of objects (fork, bowl, mug) were identified as representative of typical events that happen on kitchen surfaces. For the appliance classes, if the device had speed settings, the lowest speed and highest speed were selected and recorded as separate classes. For each class, a 1-second clip was captured while the device was operating or action was being performed, creating a single instance. Ten instances of each class were collected, forming a round. Ten rounds in total were collected, resulting in 100 total instances across 17 classes (which includes the "nothing" class).

Through a 10-round cross-validation is was found that the average performance across 17 classes is 99.3% (SD=0.7%) using a Random Forest classifier. Among the appliances there is virtually no confusion, as their frequency signatures are very distinct. In the remaining classes, there is confusion between classes that overlap; peeling and chopping both use a cutting board on the surface of the counter; the bowl and mug are both ceramic, roughly the same weight, and have similar frequency signatures. Despite other events occurring in the home during data collection, the nothing class was very consistent, with no confusion with other classes. Overall, this evaluation suggests the system can be used for in-home activity recognition systems, given their robustness to sounds and speech.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting gestures, comprising:
    an object with a surface of interest;
    a contact microphone attached to the surface of interest and configured to measure surface acoustic waves traveling along the surface of interest, wherein the contact microphone has a diaphragm and hermitically sealed in an enclosure with a MEMS sound microphone, such that the diaphragm is actuated via physical contact of the contact microphone with the surface of interest and in response to surface acoustic waves traveling along the surface of interest and thereby generates pressure waves in response to the surface acoustic waves and the pressure waves are sensed by the MEMS sound microphone; and
    a signal processor interfaced with the contact microphone and configured to receive a signal from the contact microphone, where the signal is indicative of surface acoustic waves traveling along the surface of interest and the signal processor operates to identify a gesture made by a person on the surface of interest using the signal.

2. The system of claim 1 wherein the contact microphone measures surface acoustic waves having a frequency in range of zero to 10,000 Hertz.

3. The system of claim 1 wherein the signal processor extracts features from the signal in a frequency range of zero to 10,000 Hertz and classifies the extracted features using machine learning.

4. The system of claim 3 wherein the extracted features are defined as Mel-frequency cepstral coefficients allocated to 128 mel filter banks.

5. The system of claim 3 wherein the extracted features are classified as one of a finger tap, a finger swipe, a finger fling, a nail tap, a nail swipe or a nail fling.

6. The system of claim 3 wherein the extracted features are classified using random forest methods.

7. A method for detecting gestures, comprising:
    attaching a contact microphone to a surface of interest of an object;
    measuring, by the contact microphone, surface acoustic waves traveling along the surface of interest, wherein the contact microphone has a diaphragm hermitically sealed in an enclosure with a MEMS sound microphone, such that the diaphragm is actuated via physical contact of the contact microphone with the surface of interest and in response to surface acoustic waves traveling along the surface of interest and thereby generates pressure waves in response to the surface acoustic waves and the pressure waves are sensed by the MEMS sound microphone; and
    identifying, by a signal processor, a gesture made by a person on the surface of interest using the measured signals from the contact microphone indicative of the surface acoustic waves traveling along the surface of interest.

8. The method of claim 7 further comprises measuring surface acoustic waves having a frequency in range of zero to 10,000 Hertz.

9. The method of claim 7 further comprises extracting features from the measured signals from the contact microphone in a frequency range of zero to 10,000 Hertz and classifying the extracted features using machine learning.

10. The method of claim 9 wherein the extracted features are defined as Mel-frequency cepstral coefficients allocated to 128 mel filter banks.

11. The method of claim 9 wherein the extracted features are classified as one of a finger tap, a finger swipe, a finger fling, a nail tap, a nail swipe or a nail fling.

12. The method of claim 9 wherein the extracted features are classified using random forest methods.

13. A system for detecting surface events, comprising:
    an object with a surface of interest;
    a contact microphone attached to the surface of interest and configured to measure surface acoustic waves traveling along the surface of interest, wherein the contact microphone has a diaphragm hermitically sealed in an enclosure with a MEMS sound microphone, such that the diaphragm is actuated via physical contact of the contact microphone with the surface of interest and in response to surface acoustic waves traveling along the surface of interest and thereby generates pressure waves in response to the surface acoustic waves and the pressure waves are sensed by the MEMS sound microphone; and
    a signal processor interfaced with the contact microphone and configured to receive a signal from the contact microphone, where the signal is indicative of surface acoustic waves traveling along the surface of interest and the signal processor operates to identify an event on the surface of interest using the signal.

14. The system of claim 13 wherein the contact microphone measures surface acoustic waves having a frequency in range of zero to 10,000 Hertz.

15. The system of claim 13 wherein the signal processor extracts features from the signal in a frequency range of zero to 10,000 Hertz and classifies the extracted features using machine learning.

16. The system of claim 15 wherein the extracted features are classified as one of a finger tap, a finger swipe, a finger fling, a nail tap, a nail swipe or a nail fling.

17. The system of claim 15 wherein the extract features are classified as one of a cooking-related event, placement of kitchenware or operation of an appliance.

18. The system of claim 15 wherein the extracted features are classified using random forest methods.

* * * * *